March 17, 1936.  A. H. HOOPS  2,034,343
CHARGE FORMING DEVICE FOR COMBINED LIGHT AND HEAVY FUELS
Filed June 13, 1935   3 Sheets-Sheet 1

Inventor
Albert H Hoops
by Brown & Phelps
attorneys

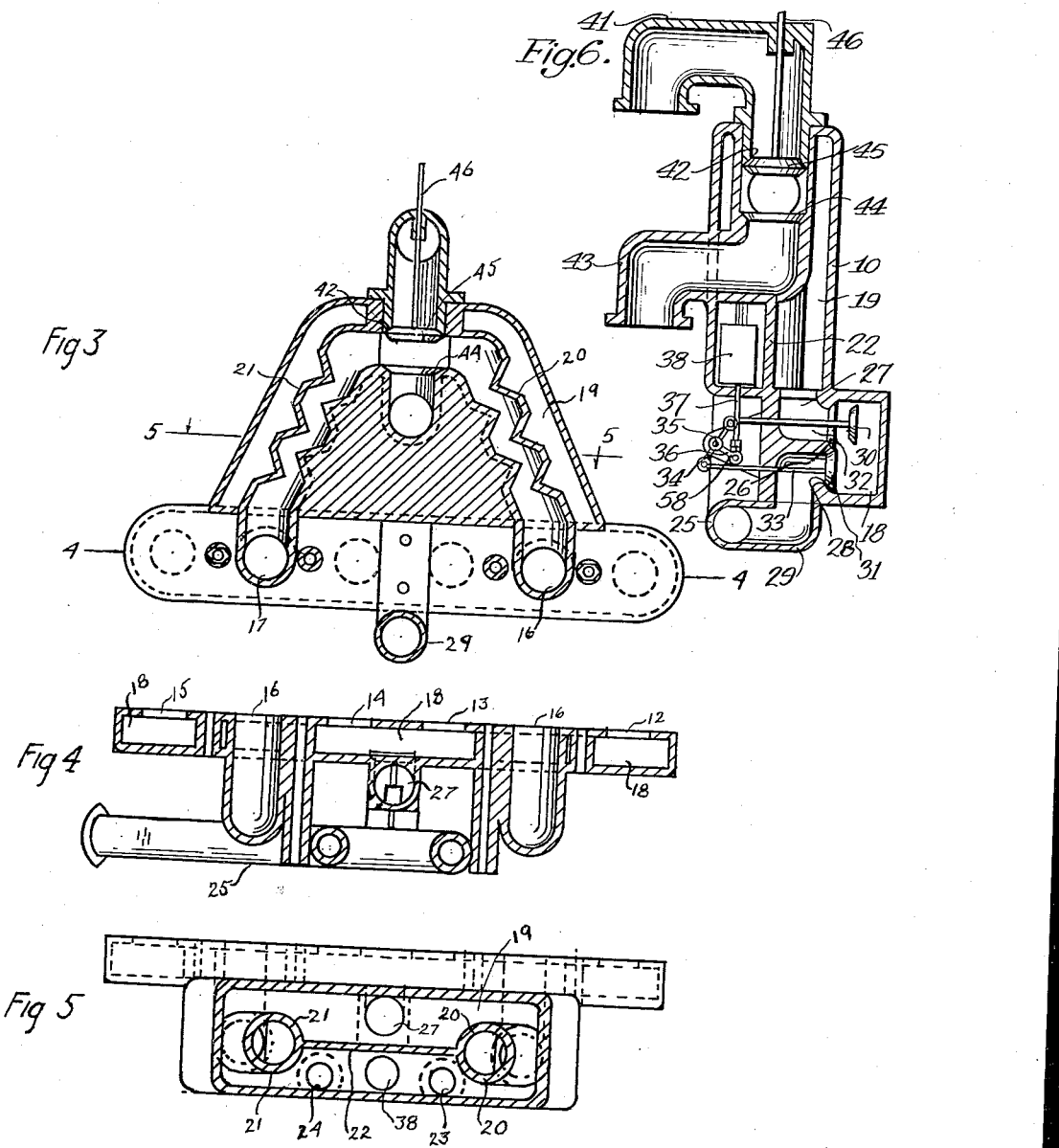

March 17, 1936.   A. H. HOOPS   2,034,343
CHARGE FORMING DEVICE FOR COMBINED LIGHT AND HEAVY FUELS
Filed June 13, 1935   3 Sheets-Sheet 3
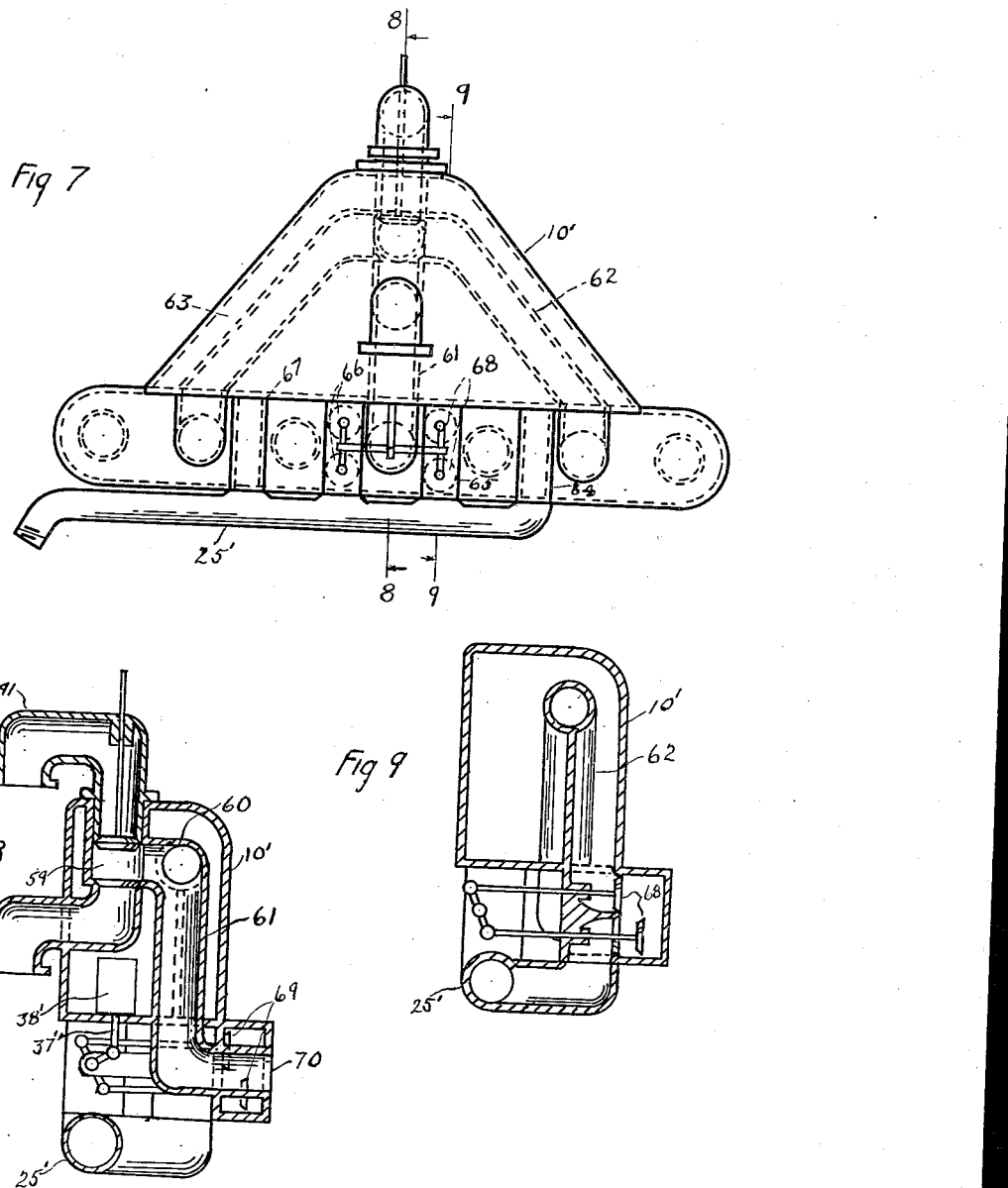

Patented Mar. 17, 1936

2,034,343

UNITED STATES PATENT OFFICE 2,034,343

CHARGE FORMING DEVICE FOR COMBINED LIGHT AND HEAVY FUELS

Albert H. Hoops, Savannah, Ga.

Application June 13, 1935, Serial No. 26,507

8 Claims. (Cl. 123—133)

The invention relates to charge forming devices and has as an object the provision of a device embodying a combined intake and exhaust manifold to render possible the use of gasoline or a heavier oil, as fuel oil, at will.

It is a further object of the invention to provide a device to enable the use of gasoline as a fuel for an internal combustion engine during the warming up period and the use of a heavier fuel, as kerosene or a fuel oil, when the motor has been properly heated up.

It is a further object of the invention to provide a device of this character having thermostatic means to control the heat applied to the fuel.

It is a further object of the invention to provide a device of this character having a double faced valve located within the heating chamber operable in one position to allow fuel to be drawn from a gasoline carbureter, in another position to draw fuel from a heavier oil carbureter, and in intermediate positions to provide a combination of these fuels.

Further objects of the invention will appear from the following description when read in connection with the accompanying drawings showing illustrative embodiments of the invention, and wherein:—

Fig. 3 is a vertical section on line 3—3 of Fig. 2 upon an enlarged scale;

Fig. 4 is a horizontal section on line 4—4 of Fig. 3;

Fig. 5 is a like section on line 5—5 of Fig. 3;

Fig. 6 is a vertical section upon an enlarged scale on line 6—6 of Fig. 1, the carbureters being omitted;

Fig. 7 is a side elevation omitting the carbureters of a device for a six-cylinder motor;

Fig. 8 is a vertical section on line 8—8 of Fig. 7; and

Fig. 9 is a vertical section on line 9—9 of Fig. 7.

Figure 1:
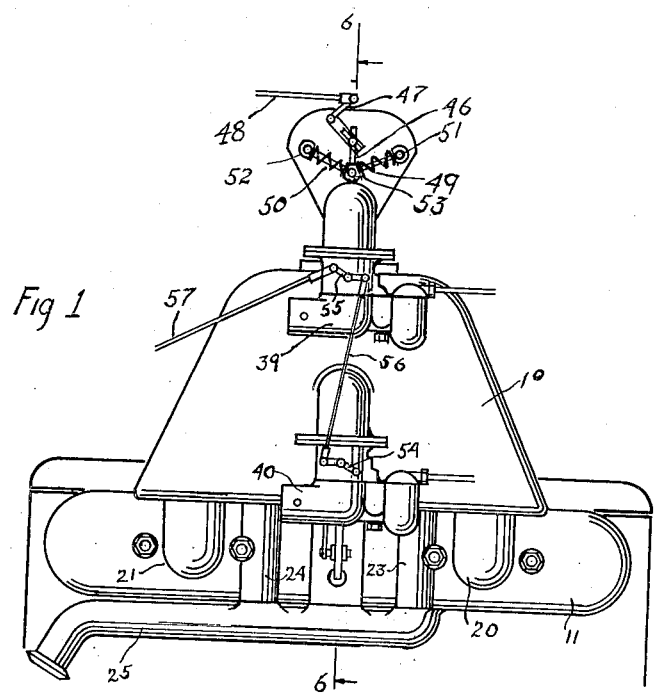
Fig. 1 is a side elevation.
Figure 2:
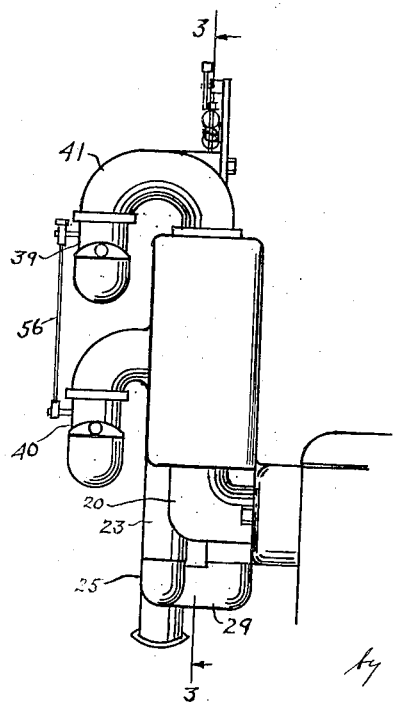
Fig. 2 is an end view.

As shown the device comprises a combined intake and exhaust manifold 10 having a member 11 attachable to an existing internal combustion engine in place of the usual intake and exhaust manifolds thereof, and provided with exhaust openings 12, 13, 14, and 15, each for one of the cylinders of a four-cylinder motor, and intake openings 16, 17, each for two cylinders of said motor.

The exhaust openings are shown as communicating with an exhaust gas passage or chamber 18 from which the exhaust gases pass upwardly into the chamber 19 through which intake conduits 20, 21 pass to the openings 16, 17. Connecting the conduits 20, 21 is a baffle plate 22 compelling the gases from passage 18 to pass upwardly and about the pipes 20, 21 in their flow to outlet conduits 23, 24 from which they escape to the exhaust pipe 25.

The exhaust gases from passage 18 escape into the chamber 19 through a port 26 and passage 27.

To provide for control of the heat applied to the intake conduits 20, 21, a bypass for exhaust gases is shown comprising a port 28 and passage 29 to the exhaust pipe 25.

To control the ports 26 and 28 there are shown valves 30, 31 carried by valve stems 32, 33 mounted upon the lever 34 at opposite sides of its pivotal axis 35 governed by a bell crank arm 36 and plunger rod 37 under control of a thermostat 38 shown as placed in the exhaust gas chamber at substantially its coolest point. The thermostat 38 may be of any desired character which can cause longitudinal movement of the rod 37.

To supply fuel to the intake manifold, there is shown a carbureter 39 for gasoline and a second carbureter 40 for heavier oil. The carbureter 39 is shown as feeding to a conduit 41 seated in the top of the chamber body 10 and terminating in a valve seat 42. Carbureter 40 is shown as feeding to a conduit 43 entering a side of the body 10 and terminating in a valve seat 44.

A double faced, double acting valve 45 is shown as reciprocable to seat upon either valve seat 42 or 44 at will, and controlled by valve stem 46, crank arm 47, and link 48, which latter may lead to the dash of the vehicle.

To hold the valve in its seated position in either direction, there are shown oppositely acting springs 49, 50 surrounding rods pivoted at 51, 52 and abutting against a knuckle 53 carried by the rod 46. The springs 49, 50 will force the valve to either seat to which it is moved by the bell crank 47, and by providing proper control of the link 48 the valve may be held in any intermediate position to draw fuel from both the gasoline and the heavy oil carbureters at the same time.

Throttle valves which may be of the usual butterfly type, not shown, are controlled by means of bell cranks 54, 55 linked together by link 56 and simultaneously controlled as by link 57 which may lead to the accelerator of an automobile.

The device may be operated upon gasoline during the warming up period with the valve 45 in its position opposite that shown in the drawings and when the motor has become heated to a sufficient degree, which is found to take place in a very few minutes, operation of the link 48 to reverse the position of the valve 45 will immediately start the motor to operating upon the heavier oil. The amount of heat applied to the fuel may be adjusted by adjusting the length of the rod 37 by means of nut 58 in an obvious manner.

The form of Figures 7, 8, and 9 is designed for a six-cylinder motor wherein three intake pipes are required to feed two cylinders each and therefore one of these pipes must be centrally located with respect to the device. For this purpose the outlet from the valve chamber 59 leads laterally to a three-branch fixture 60, the central conduit 61 from which feeds the two middle cylinders of the motor and the conduits 62, 63 of which feed the end cylinders.

In this form of the device there are four exhaust pipes 64, 65, 66, and 67 in place of pipes 23, 24 of the four cylinder motor form and there are shown two pairs of exhaust gas control ports 68, 69 in place of one pair, 26, 28, of the four cylinder form, to evenly divide the flow of the gases and to fall upon each side of the central intake opening 70, Fig. 8. The operation of this form of the device is similar to that already described.

The many devices which have already been proposed for the purpose of the present invention have failed of success from a variety of causes. Either there has been too much or too little heat applied to the oil fuel, the heat has not been properly controlled or the various intake passages have not been evenly heated or failed to evenly supply fuel mixture of even heat to the several cylinders. Operation of a motor equipped with the present invention upwardly of twenty thousand miles, without carbon trouble, dilution of crank case oil, or smoky exhaust, and with a fuel economy of substantially twenty-five miles per gallon indicates that these difficulties have been overcome.

If the oil fuel is not heated sufficiently, liquid fuel in the cylinders will dilute the crank case oil and produce an objectionably smoky exhaust. If heated too much the oil fuel mixed with air will burn in the intake conduits.

By the structure described, provision is made for ample heat, but under control. The oil intake passage to the common valve chamber has more exposure to heat than does the gasoline intake. The valve chamber, where the fuel is distributed to the various intake conduits being in the heat chamber is under heat conditions making toward effective distribution.

The exhaust gas inlet or inlets to the heat chamber being midway of the length of the exhaust manifold and of the heat chamber combined with the baffle between the intake conduits forcing the heating gases to go upwardly and about said conduits provide for even heating thereof. The intake conduits are of approximately an even length. The intake conduits pass through the exhaust gas manifold to give a final heat just before entering the engine block.

Minor changes may be made in the physical embodiments of the invention within the scope of the appended claims without departing from the spirit thereof.

I claim:

1. In a device of the class described, in combination: a heat chamber; a common intake passage in the upper portion of said chamber; a plurality of intake conduits in said chamber, radiating downwardly and outwardly from said passage to outlets to be placed in communication with intake openings of an engine, means to supply air carbureted by gasoline or by oil at will to said passage; inlet and outlet ports for ingress of exhaust gases to and exit of said gases from said chamber adjacent its lower central portion; and baffle means to provide a tortuous passage for said gases between said ports in contact with the walls of said conduits and of said common intake passage.

2. In a device of the class described, in combination: an exhaust gas passage having openings for communication with the cylinders of an engine; a heating chamber; an intake manifold having a common chamber in said heating chamber and downwardly and outwardly sloping conduits leading through said heating chamber to openings to communicate with the intake openings of an engine; a baffle plate connecting the walls of said conduits; a passage opening between said exhaust gas passage and said chamber at one side of said baffle; an outlet passage from said chamber at the opposite side of said baffle; and means to at will supply light or heavy fuel to said common chamber.

3. In a device of the class described, in combination: an exhaust gas chamber closed at its ends and having openings in a side thereof to be placed into direct communication with the exhaust ports of an engine; a heat chamber above said exhaust chamber and having an inlet port opening into said chamber adjacent its central portion; an exhaust pipe; a port opening from said exhaust chamber to said pipe; valve means controlling said ports to by pass a desired portion of exhaust gases about said chamber in accordance with heat conditions in said chamber; a plurality of intake conduits extending downwardly through said heat chamber; and means to at will supply gasoline or oil fuel mixture to said intake conduits.

4. In a device of the class described, in combination: an exhaust gas chamber closed at its ends and having openings in a side thereof to be placed into direct communication with the exhaust ports of an engine; a heat chamber above said exhaust chamber and having an inlet port opening into said chamber adjacent its central portion; an exhaust pipe; a port opening from said exhaust chamber to said pipe; valve means controlling said ports to by pass a desired portion of exhaust gases about said chamber in accordance with heat conditions in said chamber; a plurality of intake conduits extending downwardly through said heat chamber, means to at will supply gasoline or oil fuel mixture to said intake conduits; and thermostatic means to actuate said valve means.

5. In a device of the class described, in combination: a heat chamber; aligned intake passages opening into a common valve chamber enclosed in said heat chamber; oppositely facing valve seats about the openings of said passage; a double faced valve in said valve chamber coacting with either of said seats at will; a gasoline carburetor and an oil carburetor connected with said respective passages; intake conduits radiating from said valve chamber within said heat chamber and having outlets to be placed in communication with inlet ports of an engine; baffle means between said conduits; inlet and outlet ports on opposite sides of said baffle means for ingress and egress of exhaust gases to and from said heat chamber.

6. In a device of the class described, in combination: an exhaust manifold to receive from the exhaust ports of an engine; a heat chamber having an exhaust inlet from said manifold substantially midway thereof and an exhaust outlet substantially opposite said inlet; a valve chamber adjacent the upper portion of and enclosed in said heat chamber; gasoline and oil fuel inlets to said valve chamber; a double acting valve in said chamber to at will control supply of a chosen fuel; intake conduits radiating within said chamber from said valve chamber to communicate with the inlet ports of the engine; and baffle means between said conduits to cause exhaust gas to pass around said conduits between said gas inlet and outlet to and from said chamber.

7. In a device of the class described, in combination: an exhaust manifold to receive from the exhaust ports of an engine; a heat chamber having an exhaust inlet from said manifold substantially midway thereof and an exhaust outlet substantially opposite said inlet; a valve chamber adjacent the upper portion of and enclosed in said heat chamber; gasoline and oil fuel inlets to said valve chamber; a double acting valve in said chamber to at will control supply of a chosen fuel; intake conduits radiating within said chamber from said valve chamber to communicate with the inlet ports of the engine; baffle means between said conduits to cause exhaust gas to pass around said conduits between said gas inlet and outlet to and from said chamber; an exhaust pipe communicating with the outlet from said heating chamber; and a by pass port opening between said exhaust manifold and said exhaust pipe.

8. In a device of the class described in combination: an exhaust gas chamber having openings in its sides, for direct connection with an engine block to place said openings into communication with the exhaust ports of the engine; a heat chamber joined to a wall of said first named chamber and extending thereabove; a common intake chamber centrally located in the upper portion of said heat chamber; intake conduits symmetrically located in said heat chamber, extending downwardly therein and through said exhaust chamber to ports to be placed in communication with the intake ports of an engine block; aligned intake passages extending in opposite directions to said common chamber; means to supply readily and difficultly vaporized fuel mixtures to the respective intake passages; a double acting valve operable in said common chamber to select the fuel to be burned; a port opening between said exhaust and heat chambers and an outlet port from said heat chamber.

ALBERT H. HOOPS.